(12) United States Patent
Mazaira et al.

(10) Patent No.: US 12,420,672 B2
(45) Date of Patent: Sep. 23, 2025

(54) SYSTEM AND METHOD FOR MOTOR ELECTRONICS WASTE HEAT RECOVERY AND DETERMINATION

(71) Applicant: FORD GLOBAL TECHNOLOGIES, LLC, Dearborn, MI (US)

(72) Inventors: Jordan Mazaira, Taylor, MI (US); Brett Allen Dunn, Plymouth, MI (US); Zachary March, Fort Collins, CO (US); Justin Barsano, Hazel Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 732 days.

(21) Appl. No.: 17/856,610

(22) Filed: Jul. 1, 2022

(65) Prior Publication Data

US 2024/0001805 A1    Jan. 4, 2024

(51) Int. Cl.
*B60L 58/24*     (2019.01)
*B60H 1/00*      (2006.01)
*B60H 1/14*      (2006.01)

(52) U.S. Cl.
CPC .......... *B60L 58/24* (2019.02); *B60H 1/00278* (2013.01); *B60H 1/00764* (2013.01); *B60H 1/143* (2013.01)

(58) Field of Classification Search
CPC . B60L 58/24; B60H 1/00278; B60H 1/00271; B60H 1/00764; B60H 1/00735; B60H 1/143; B60H 1/14
See application file for complete search history.

(56) References Cited

U.S. PATENT DOCUMENTS

| | | | |
|---|---|---|---|
| 10,730,403 B2 | 8/2020 | Ford | |
| 10,889,205 B2 * | 1/2021 | Hettrich | B60L 1/003 |
| 2011/0214930 A1 | 9/2011 | Betts et al. | |
| 2012/0235640 A1 | 9/2012 | Bridges et al. | |

FOREIGN PATENT DOCUMENTS

CN        118457141 A  *   8/2024

OTHER PUBLICATIONS

Bower, G., "Tesla Model S Recycles Waste Heat to Warm the Battery", INSIDEEEVs, Jan. 30, 2016, https://insideevs.com/news/327663/tesla-model-s-recycles-waste-heat-to-warm-the-battery/, 4 pgs.

* cited by examiner

*Primary Examiner* — John D Walters
(74) *Attorney, Agent, or Firm* — David B. Kelley; Brooks Kushman P.C.

(57) ABSTRACT

A system is provided that includes at least one battery, motor electronics, and at least one vehicle controller. The at least one battery is positioned about a battery coolant loop that provides first coolant to change a temperature of the at least one battery. The motor electronics are positioned about a motor electronics coolant loop that provides second coolant to change a temperature of the motor electronics. The at least one vehicle controller is programmed to receive a first signal indicative of a temperature of the at least one battery positioned about the battery coolant loop and to control a valve to combine the battery coolant loop with the motor electronics coolant loop such that the second coolant flows to the battery coolant loop responsive to at least a temperature of the second coolant being greater than the temperature of the at least one battery and a first offset.

19 Claims, 4 Drawing Sheets

SYSTEM AND METHOD FOR MOTOR ELECTRONICS WASTE HEAT RECOVERY AND DETERMINATION

TECHNICAL FIELD

Aspects disclosed herein generally relate to a system and method for motor electronics waste heat recovery and determination. The disclosed system and method may be applied to vehicles such as, for example, a battery electric vehicle (BEV), a hybrid electric vehicle (HEV), plug-in-electric vehicle (PHEV), or a fuel cell electric vehicle (FCEV). These aspects and others will be discussed in more detail below.

BACKGROUND

A controller may pre-heat a coolant in a power electronics loop via heat transfer between the coolant and an electronic component in response to an ambient temperature being less than a threshold and a coolant temperature being less than a battery temperature. The controller may also pump the coolant through a battery loop in response to the coolant temperature exceeding the battery temperature.

SUMMARY

In at least one embodiment, a system for performing motor electronics coolant determination and waste heat recovery. The system including at least one battery, motor electronics, and at least one vehicle controller. The at least one battery is positioned about a battery coolant loop that provides first coolant to change a temperature of the at least one battery. The motor electronics are positioned about a motor electronics coolant loop that provides second coolant to change a temperature of the motor electronics. The at least one vehicle controller is programmed to receive a first signal indicative of a temperature of the at least one battery positioned about a battery coolant loop and to control a valve to combine the battery coolant loop with the motor electronics loop such that the second coolant of the motor electronic coolant loop flows to the battery coolant loop responsive to at least a temperature of the second coolant being greater than the temperature of the at least one battery and a first offset.

In at least another embodiment, a method for performing motor electronics coolant determination and waste heat recovery is provided. The method includes providing first coolant to change a temperature of at least one battery positioned about a battery coolant loop and providing second coolant to change a temperature of the motor electronics positioned about a motor electronics coolant loop. The method also includes receiving, by at least one vehicle controller, a first signal indicative of a temperature of the at least one battery positioned about a battery coolant loop and controlling a valve to combine the battery coolant loop with the motor electronics coolant loop such that the second coolant of the motor electronic coolant loop flows to the battery coolant loop responsive to at least a temperature of the second coolant being greater than the temperature of the at least one battery and a first offset.

In at least another embodiment, a non-transitory computer readable medium storing a computer-program product that is programmed to perform motor electronics coolant determination and waste heat recovery is provided. The computer-program product includes instructions to provide first coolant to change a temperature of at least one battery positioned about a battery coolant loop and to provide second coolant to change a temperature of the motor electronics motor electronics positioned about a motor electronics coolant. The computer-program product includes instructions to receive, by at least one vehicle controller, a first signal indicative of a temperature of the at least one battery positioned about a battery coolant loop and to control a valve to combine the battery coolant loop with the motor electronics coolant loop such that the second coolant of the motor electronic coolant loop flows to the battery coolant loop responsive to at least a temperature of the second coolant being greater than the temperature of the at least one battery and a first offset.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
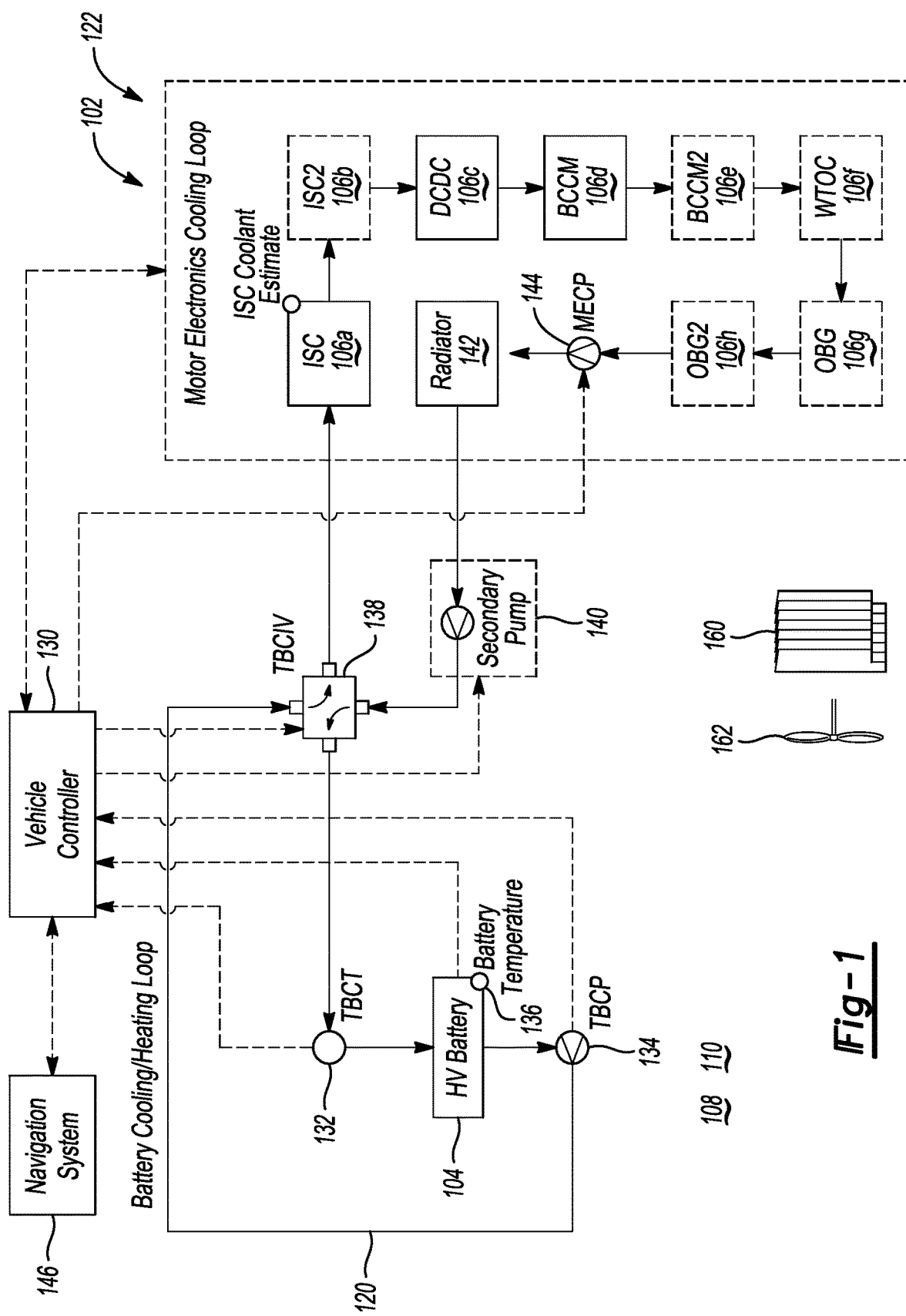
FIG. 1 depicts a system for providing motor electronics waste heat recovery and determination in accordance with one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

High voltage (HV) traction batteries for use in a vehicle may be sensitive to cold temperatures thereby resulting in power limiting and reduced range. To heat such traction batteries, some manufactures may provide dedicated battery heaters. In other implementations, the vehicle may share a heater between a cabin vehicle and battery. In general, shared heaters can affect cabin comfort. For example, this may be the case when heat that is provided from either a dedicated heater or a shared heater reduces the range of the vehicle. In this instance, the vehicle may limit the heating operation to preserve vehicle range.

By estimating the coolant temperature in a motor electronics coolant loop, the disclosed thermal system may determine if combining the motor electronics and battery coolant loops into one combined loop can be beneficial for battery warming. The heat generated by the motor electronics is normally dissipated into an environment through a low temperature radiator. The air flow to the radiator is controlled by opening active grille shutter(s) (AGS) and commanding an electrically driven fan. With the disclosed system and method, a motor electronics waste heat recovery system can provide or transfer the heat generated from the motor electronics to the HV battery.

The disclosed system and method perform a motor electronics coolant estimation based on coolant flow so the thermal system is capable of requesting coolant flow if necessary. If the time since a valid estimation is greater than a threshold, then a vehicle controller controls a coolant pump to run for a necessary length of time when the vehicle is detected to be traveling towards a direct current (DC) fast charger (or DC charging station) or if the coolant pump is requested to cool any one of the motor electronics components.

The thresholds needed for heating the battery changes based on the manner in which the vehicle is being used. While the vehicle is driving, the heating threshold may be moderate and led by a desire to increase useable range and power. While charging the vehicle via DC Fast Charging or on route to a charger, the heating threshold for the battery may need to be higher to accept the full charging power of the station. In addition, when AC charging via alternating current (AC) the overall amount of heating for the battery to accept full charging may not be needed unless the battery is very cold. However, by heating the battery with waste heat, fans typically needed for charging do not need to run. This aspect reduces noise, vibration, and harshness (NVH), decreases charging time by reducing auxiliary loads, and has the added benefit of having a warmer battery for drive away conditions.

In a combined mode, one object may include transferring the heat generated from the motor electronics into the battery instead of the environment. Thus, in the combined mode, the disclosed system commands the AGS to close and the fan to an off position as long as the measured battery coolant temperature is less than motor electronics coolant limit. To avoid over-heating, the coolant temperature that flows through a motor electronics loop may be monitored. If the temperature of the coolant of the battery is greater than a limit of the coolant of the motor electronics coolant loop, then vehicle controller activates the AGS and fan until the coolant temperature drops below the threshold minus a hysteresis. One or more of the above foregoing aspects will be discussed in more detail below.

FIG. 1 depicts a system 100 for providing motor electronics waste heat recovery and determination in accordance with one embodiment. The system 100 may be implemented in a vehicle 102 such as, for example, a battery electric vehicle (BEV), a hybrid electric vehicle (HEV), plug-in-electric vehicle (PHEV), or a fuel cell electric vehicle (FCEV). The system 100 generally includes one or more vehicle batteries 104 (the battery 104) and a plurality of motor electronics 106a-106g. In general, the battery 104 may be charged via DC or AC power to store energy thereon to power the vehicle 102. The plurality of motor electronics 106a-106h may facilitate or enable charging of the battery 104 via power transfer from an external power source 110. The battery 104 may discharge a HV DC output to power any number of loads 108 (e.g., HV or LV loads 108) in the vehicle 102. The loads 108 may be controlled by any number of electrical controllers (not shown) in the vehicle 102.

In certain moments, it may be preferable to increase an overall temperature of the battery 104 particularly in moments where it is desirable to charge the battery 104. For example, the battery 104 may need to be pre-heated to achieve ideal performance power. Thus, in this regard, a battery coolant loop 120 is provided in the system 100 to deliver coolant to the battery 104 in an effort to warm the battery 104 (e.g., increase the temperature of the battery 104) in various operating modes for the vehicle 102. In addition, the various motor electronics 106a-106h generally comprise controllers and/or power electronics that generate heat. A motor electronics coolant loop 122 is provided in the system 100 to pass coolant through the various motor electronics 106a-106g for the purpose of cooling such electronics 106a-106g by absorbing the heat generated by the electronics 106a-106g. The coolant is delivered through the loop 122 to remove the heat and maintain optimum working temperatures for the electronics 106a-106g to operate.

In one example, the motor electronics 106a and 106b may each be implemented as an Inverter System Controller (ISC). The ISCs 106 and 106b converts DC energy into AC energy and facilitates the transfer of energy for storage on the battery 104. The motor electronics 106b may be implemented as a DC/DC converter to convert a HV DC input into a LV DC output to facility energy storage on the battery. The motor electronics 106d and 106e may each be implemented as battery charge control module to control the charging operation of the battery 104. The motor electronics 106f may be implemented as a water to oil cooler (WTOC). The WTOC 106f may be considered another heat source and take heat from oil and transfers the heat to the coolant in the motor electronics coolant loop 122. The motor electronics 106g-106f may each be implemented as an on-board generator (OBG) which correspond to plug in modules on the vehicle that couple to outlets on the electrical grid.

The system 100 further includes at least one vehicle controller 130 (hereafter the vehicle controller 130), a first temperature sensor 132, a traction battery coolant pump (or the first pump) 134, a second temperature sensor 136, a traction battery coolant isolation valve (TBCIV) 138 (or the first valve 138), a second pump 140, and a navigation system 146. The first pump 134 may be positioned in the battery cooling loop 120 and pumps the coolant to the first valve 138. The first pump 134 may be positioned downstream in the loop 120 away from the battery 104.

The second temperature sensor 136 may be positioned anywhere near or on the battery 104 to provide a temperature of the battery 104. A radiator 142 and a third pump 144 is positioned in the motor electronics cooling loop 122. The third pump 144 delivers coolant from the motor electronics coolant loop 122 to the radiator 142 in response to a first control signal from the vehicle controller 130. The radiator 142 may draw a portion of the heat away from the coolant and transfer the coolant to the second pump (or the secondary pump) 140. In turn, the secondary pump 140 delivers the coolant from the motor electronics coolant loop 122 to the battery coolant loop 120 via the first valve 138 under various conditions in response to a second control signal from the vehicle controller 130. The various conditions in which the motor electronics coolant loop 122 delivers heated coolant to the battery coolant loop 120 to heat the battery 104 (or increase the temperature of the battery 104) will be discussed in more detail in connection with one or more of FIGS. 2-5.

It is recognized that the vehicle controller 130 may control the first valve 138 to enable coolant from the motor electronics coolant loop 122 to pass to the battery coolant loop 120 to combine both the motor electronics coolant loop 122 and the battery coolant loop 120. Conversely, the vehicle controller 130 may also control the first valve 138 to disable the coolant from being delivered from the motor electronics coolant loop 122 to the battery coolant loop 120 to separate the motor electronics coolant loop 122 from the battery coolant loop 120 in moments in which it may not be necessary to heat the battery 104 with the coolant from the motor electronics 106a-106h. The system 100 also includes grille shutters 160 and a cooling fan 162 positioned proximate to the motor electronics coolant loop 121.

The system 100 also includes a navigation system 146 that provides a location/destination of the vehicle 102. The navigation system 146 may provide an indication to the vehicle controller 130 that the vehicle 102 may be heading toward a battery charging station to provide an early indication that the battery 104 may undergo a charging operation in order to pre-heat the battery 104. This aspect will be discussed in more detail below.

Figure 2:
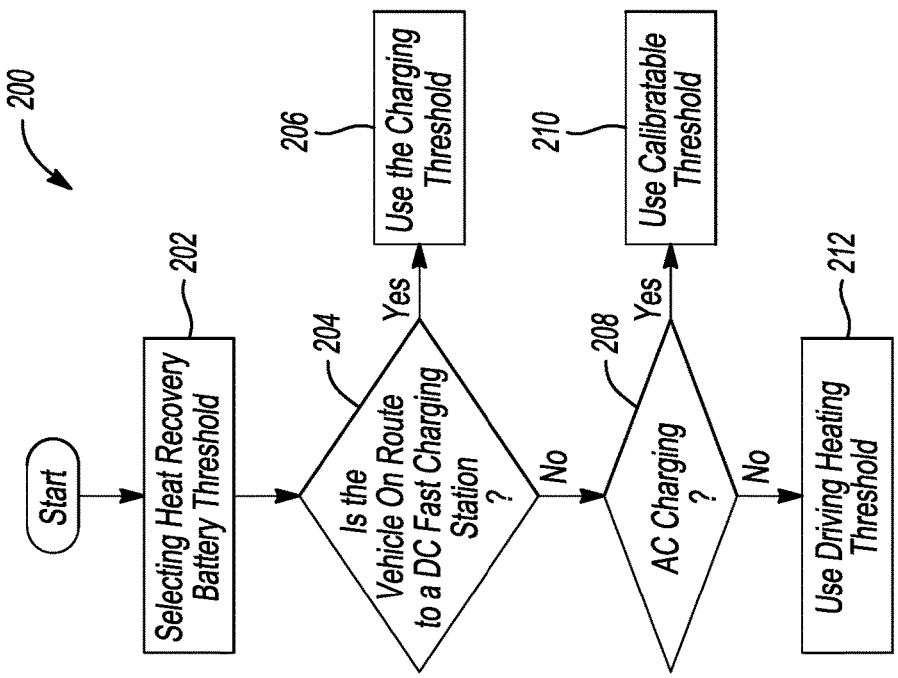
FIG. 2 depicts a method for establishing a battery temperature threshold in accordance with one embodiment.

FIG. 2 depicts a method 200 for establishing a battery temperature threshold in accordance with one embodiment. For example, at operation 202, the vehicle controller 130 established different temperature thresholds for the battery 104 based on the rest of the operations of the method 200 as will be described in more detail below.

In operation 204, the vehicle controller 130 determines whether the vehicle 102 is on route to a DC fast charging station (e.g., a DC based charging station). In this case, the vehicle controller 130 receives destination information from the navigation system 146 which may indicate that the vehicle 102 is on route to the DC fast charging station. In one example, a driver of the vehicle may input the charger destination via a user interface (not shown) in the vehicle 102 or via a mobile device that is electrically coupled to the vehicle 102. In addition, the navigation system 146 may determine if the vehicle 102 is within a predetermined distance of the DC charging station and transmit a command indicative of the vehicle 102 being with the predetermined distance of the vehicle 102 to alert the vehicle controller 130 that the vehicle 102 may be heading toward the DC charging station to charge the vehicle 102. If this condition is true, the vehicle controller 130 selects a first predetermined target temperature for the battery 104. If this condition is false, then the method 200 moves to operation 208.

In operation 206, the vehicle controller 130 sets a first temperature threshold for the battery 104. In general, the first temperature threshold for the battery 104 generally corresponds to a desired temperature level for the battery 104 to prepare/prime the battery 104 for a DC charging operation. The vehicle controller 130 may set the first temperature threshold to, for example, 15-20 C, or 25 C. In general, the vehicle controller 130 may set the first temperature threshold to any number of temperatures based on the type of DC charger that is being used to charge the vehicle 102. For example, the DC charger may be a 50 KW, 150 KW, and 350 KW charger. In general, the DC charging station may transmit information corresponding to the charger rate and/or power to the vehicle 102. In this regard, the vehicle controller 130 may set a particular temperature threshold for the battery 104 based on the type of charger being used.

In operation 208, the vehicle controller 130 determines whether the vehicle 102 is undergoing AC charging operation. In this case, the vehicle controller 130 determines whether the vehicle 102 is being charged via a charger that provides an incoming AC input (e.g., 100 to 240 VAC), for example, an external source or electrical outlet (e.g., coupled to the electrical grid). If this condition is true, then the method 200 moves to operation 210. If not, then the method 200 moves to operation 212.

In operation 210, the vehicle controller 130 sets a second temperature threshold for the battery 104. In general, the second temperature threshold for the battery 104 generally corresponds to a desired temperature level for the battery 104 to prepare/prime the battery 104 for an AC charging operation. It is recognized that the first and the second temperature thresholds for the battery 104 may be similar to one another or may be different from one another. In one example, the second temperature threshold for the battery 104 may be higher than the first temperature threshold and may be set to, for example, a temperature within the range of 20 to 30 C. Warming the battery 104 to a higher temperature may be more advantageous given that AC charging is involved. For example, a warmer battery (or battery pack) may take in more energy (i.e., increases energy input into the pack), and during charging, the warmer battery may reduce the amount of noise generated to cool the motor electronics as the vehicle 102 uses the battery 104 as a heat sink.

In operation 212, the vehicle controller 130 establishes a third predetermine temperature threshold for the battery 104. In this case, the vehicle controller 130 detects that a key is in ignition (or a key that enables access to the vehicle 102 is in close proximity to the vehicle 102) and the conditions as set forth in operations 204 and 208 are not true. The third predetermined temperature threshold for the battery 104 may be set to, for example, 15° C. The third predetermined threshold may correspond to a temperature for the battery 104 that achieves an ideal range and performance for the vehicle 102.

Figure 3:
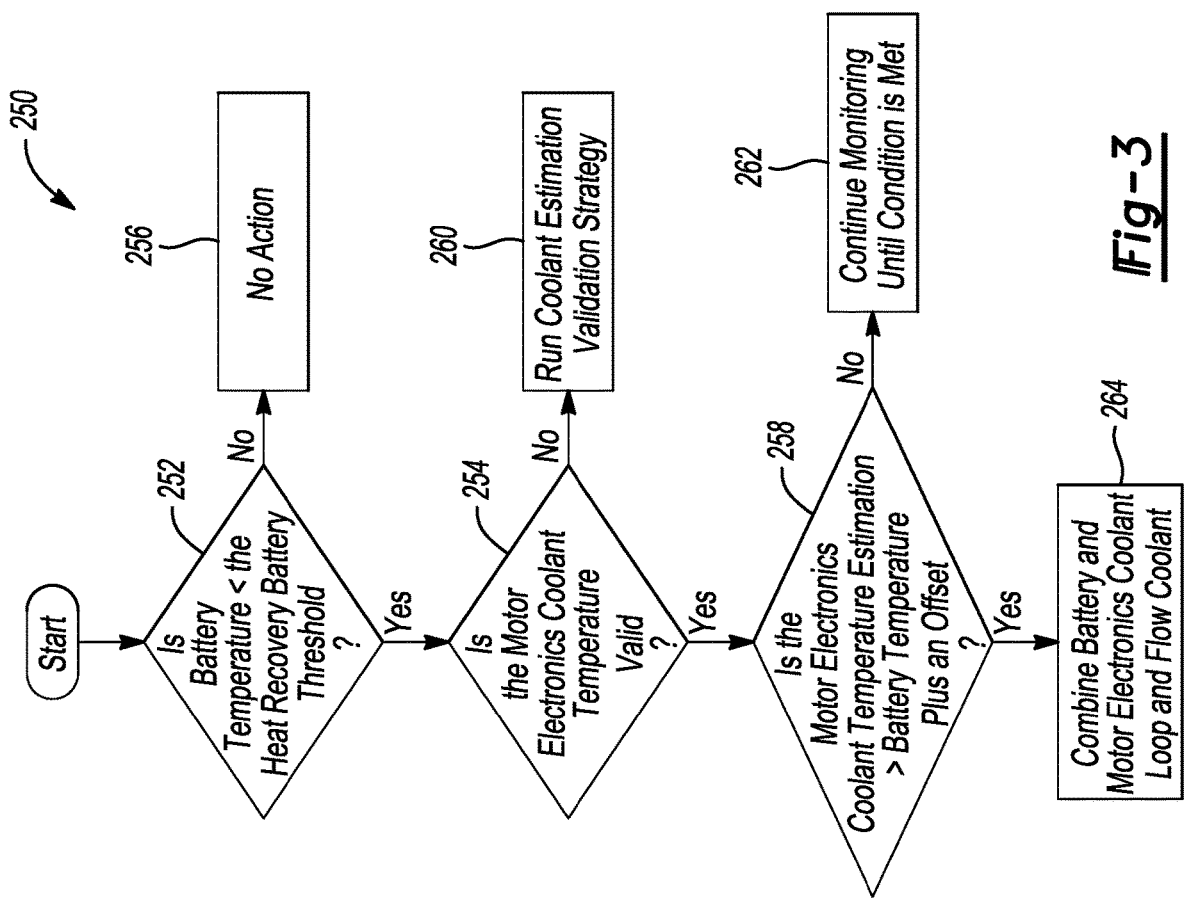
FIG. 3 depicts a method for combining a coolant loop for the battery and motor electronics assembly for the disclosed system(s) in accordance with one embodiment.

FIG. 3 depicts a method 250 for combining a coolant loop for the battery 104 and motor electronics 106a-106h (or moto electronics assembly 106) for the disclosed system 100 in accordance with one embodiment. In operation 252, the vehicle controller 130 receives signals from any one or more of the first and second temperature sensors 132 and 136 to monitor the temperature of the battery 104. The vehicle controller 130 compares the measured temperature to either the first, second, or third temperature thresholds (or the heat recovery battery threshold) for the battery 104 as derived from the method 200. The vehicle controller 130 compares the measured temperature to the first, second or third predetermined thresholds based on whether the vehicle 102 is traveling to a DC fast charger, the vehicle 102 is undergoing AC charging, or the ignition of the vehicle 102 is detected to be in the "ON" position while the vehicle 102 is not on its way to the DC fast charger or undergoing AC charging. If the measured temperature is less than the heat recovery battery threshold, then the method 250 move to operation 254. If not, then the method 250 moves to operation 256 and no further action is performed In operation 254, the vehicle controller 130 determines whether the temperature of the coolant associated with the motor electronics 106a-106h within the motor electronics coolant loop 122 (or the motor electronics coolant temperature) is valid. Internally, the ISC 106a includes one or more thermocouples along with a transfer function stored therein. The vehicle controller 130 may provide an estimate of the temperature of the coolant within the motor electronics coolant loop 122. This estimate may be used to provide the temperature of the coolant within the motor electronics coolant loop 122. This estimate is generally only valid while there is a flow. If estimate is not valid, the vehicle controller 130 activates the pump 144 for a predetermined amount of time depending on whether the driver is driving to a DC charging station. It is generally recognized that the thermocouples do not provide an actual measurement of the coolant in the motor electronics coolant loop 122. However, such thermocouples provide temperature and based on this temperature the vehicle controller 130 utilizes the transfer function to determine whether the coolant has been flowing for a predetermined amount of time. If this condition is true, then the method 250 moves to operation 258. If not, then the method 250 moves to operation 260 to execute a run coolant estimation validation strategy. This will be discussed in more detail in connection with method 300 of FIG. 4.

In operation 258, the vehicle controller 130 determines whether the motor electronics coolant temperature is greater than the measured battery temperature plus an offset. The offset provides hysteresis to ensure that there is heating capability in the system to avoid dynamic switching on and off. If this condition is true, then the method 250 moves to operation 264. If not, the method 250 moves to operation 262.

In operation 262, the vehicle controller 130 continues monitoring the measured battery temperature and comparing the same plus the offset to the motor electronic coolant temperature.

In operation 264, the vehicle controller 130 may control the first valve 138 to enable coolant from the motor electronics coolant loop 122 to pass to the battery coolant loop 120 to heat the battery 104. In operation 264, the vehicle controller 130 combines both the motor electronics coolant loop 122 and the battery coolant loop 120 to heat the battery 104.

Figure 4:
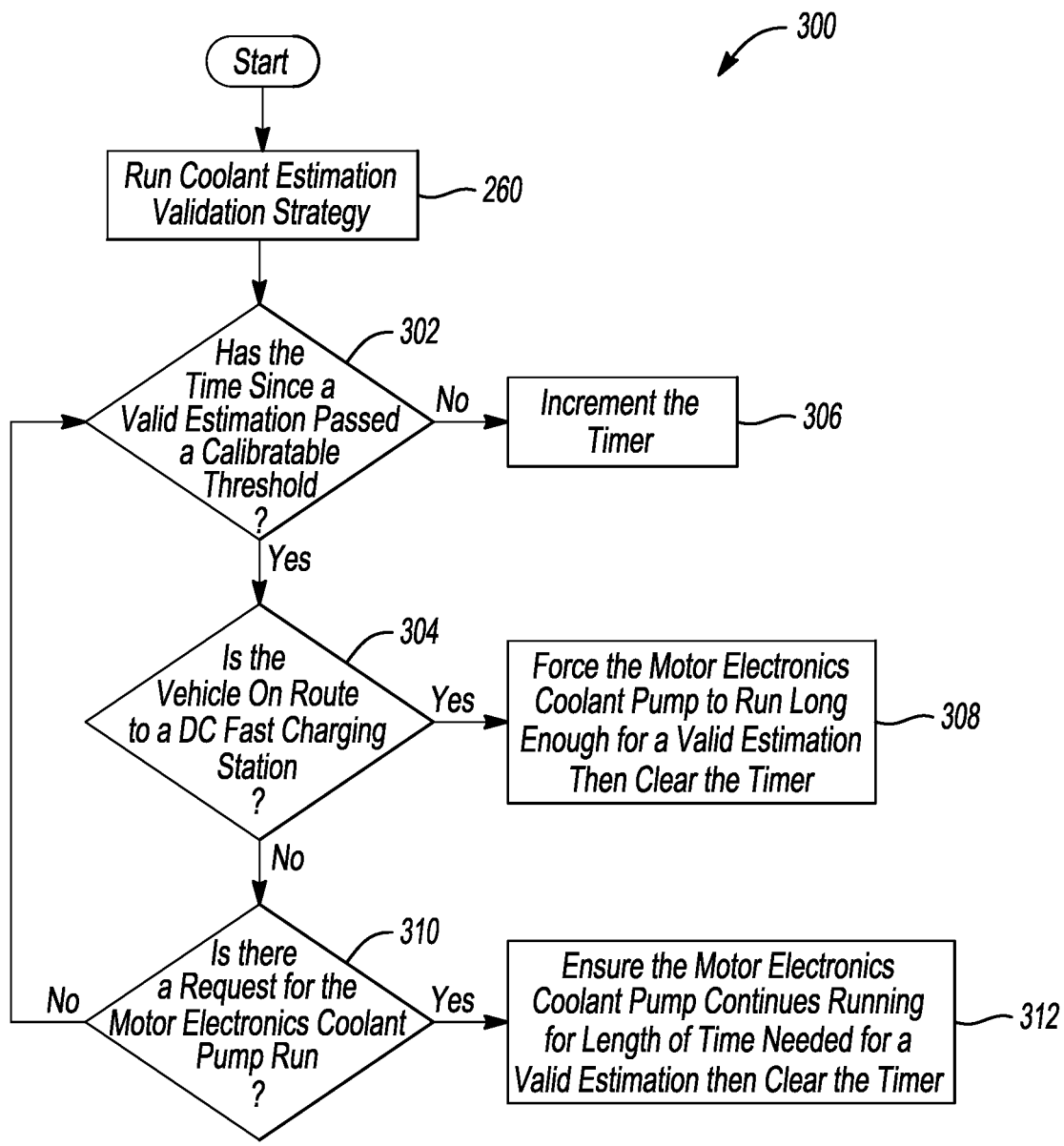
FIG. 4 depicts a method for executing a motor electronics estimation strategy for the disclosed system(s) in accordance with one embodiment.

FIG. 4 depicts another method 300 executing a motor electronics estimation strategy for the disclosed system(s) in accordance with one embodiment. In operation 260, the vehicle controller 130 executes a run coolant estimation validation strategy.

In operation 302, the vehicle controller 130 determines whether enough time has passed since a previous motor electronics temperature threshold has been established. In other words, the vehicle controller 130 initiates a timer to allow the coolant in the motor electronics coolant loop 122 to warm up. If the timer has expired, then the method 300 moves to operation 304. If not, then the method 300 moves to operation 306 and increments the timer.

In operation 304, the vehicle controller 130 determines whether the vehicle 102 is on route to the DC fast charging station (e.g., a DC based charging station). As noted above, the vehicle controller 130 receives destination information from the navigation system 146 which may indicate that the vehicle 102 is on route to the DC fast charging station. In one example, the driver of the vehicle 102 may input the charger destination via the user interface (not shown) in the vehicle 102 or via the mobile device that is electrically coupled to the vehicle 102. In addition, the navigation system 146 may determine if the vehicle 102 is within a predetermined distance of the DC charging station and transmit a command indicative of the vehicle 102 being with the predetermined distance of the vehicle 102 to alert the vehicle controller 130 that the vehicle 102 may be traveling toward the DC charging station to charge the vehicle 102. If this condition is true, then the method 300 moves to operation 308. If not, then the method 300 moves to operation 310.

In operation 308, the vehicle controller 130 controls the third pump 144 positioned within the motor electronics coolant loop 122 to pump the coolant therethrough for a predetermined amount of time in order to obtain an estimation of the temperature of the coolant within the motor electronics coolant loop 122. In one example, the predetermined amount of time for running the coolant within the motor electronics coolant loop 122 may be one to two minutes or other suitable value. Once the one to two minute period has elapsed and an estimate of the temperature of the coolant within the motor electronics coolant loop 122 has been obtained, the vehicle controller 130 may clear this time period (e.g., the 1 or 2 minute period) and repeat operation 308. This is more aggressive that 310, since we want the hotted battery ASAP.

In operation 310, the vehicle controller 130 determines if there was a request for the third pump 144 to run to pass the coolant within the motor electronics coolant loop 122. Any one of the motor electronics 106a-106h may request cooling. If this condition is true, then the method 300 moves to operation 312. If not, then the method 300 moves back to operation 302. Operation 312, is similar to operation 308 in which the vehicle controller 130 controls the third pump 144 positioned within the motor electronics coolant loop 122 to pump the coolant therethrough for a predetermined amount of time in order to obtain an estimation of the temperature of the coolant within the motor electronics coolant loop 122.

Figure 5:
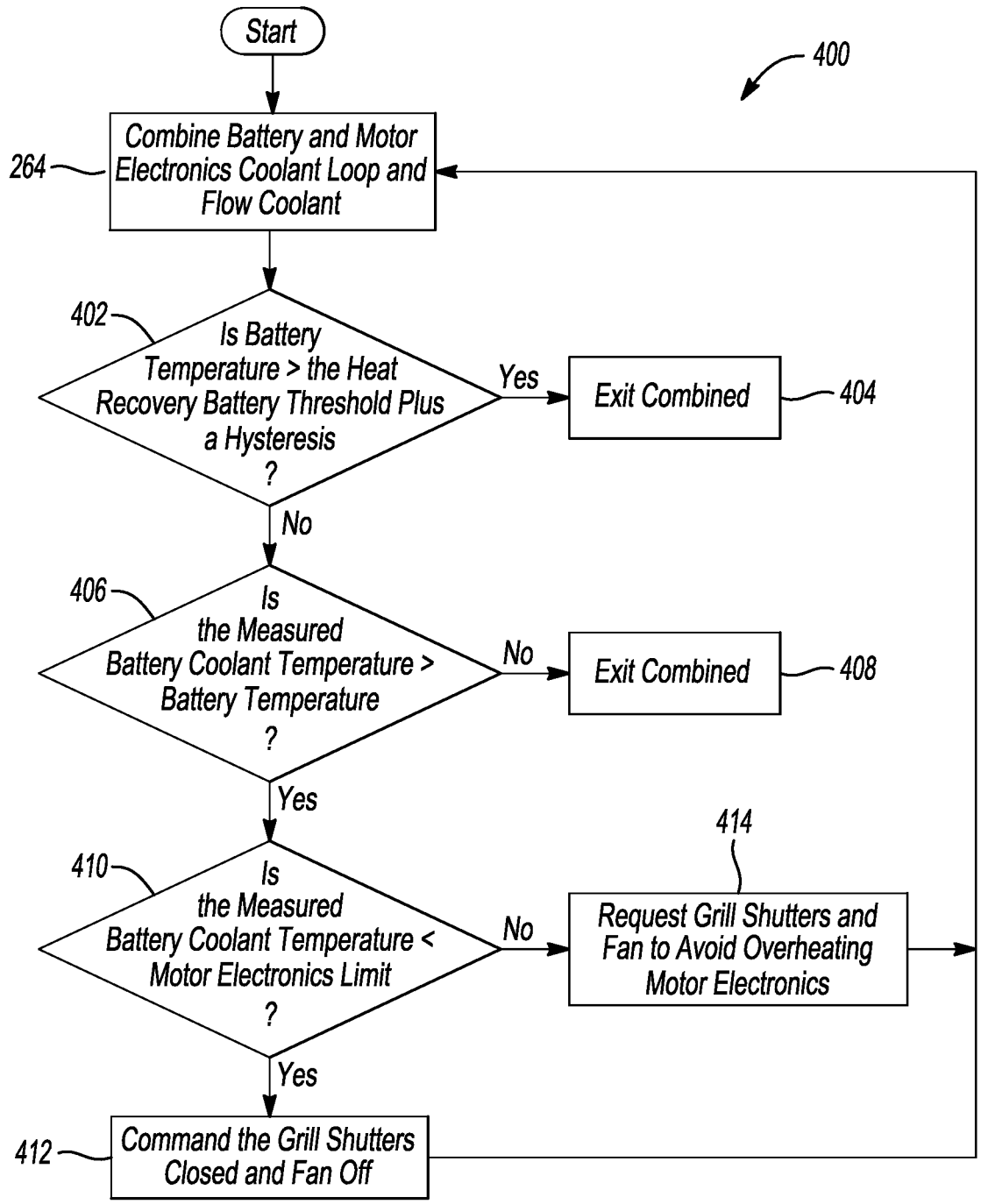
FIG. 5 depicts another method that provides additional details related to the method of FIG. 3 in accordance with one embodiment.

FIG. 5 depicts another method 400 that provides additional details related to the method of FIG. 3 in accordance with one embodiment. In operation 264, the vehicle controller 130 combines the battery coolant loop 120 with the motor electronics coolant loop 122 to warm the battery 104.

In operation 402, the vehicle controller 130 determines whether the measured battery temperature is greater than the heat recovery battery threshold (or the first, second, or third temperature thresholds as established in FIG. 2) plus a hysteresis value. The measured battery temperature may be provided by the second temperature sensor 136 as the sensor 136 may be in close proximity or positioned directly on the battery 104. If the measured battery temperature is greater than the heat recovery battery threshold plus the hysteresis value, then the method 400 moves to operation 404 and exits the method 400 or re-executes operation 402. If the measured battery temperature is less than the heat recovery battery threshold plus the hysteresis value, then the method 400 moves to operation 406.

In operation 404, the vehicle controller 130 determines whether the measured coolant in the battery coolant loop 120 is greater than the temperature of the battery 104. If this condition is true, then the method 400 moves to operation 410. If this condition is false, then the method 400 moves to operation 408 and exits the method 400. Conversely, the method 400 may move back to operation 264 for re-execution.

In operation 410, the vehicle controller 130 determines whether the measured battery coolant is less than a maximum limit of the coolant of the motor electronics cooling loop 122. If this condition is true, then the method 400 proceed to operation 412. If not, then the method 400 moves to operation 414.

In operation 412, the vehicle controller 130 deactivates the grille shutters 160 and the fan 162. In another embodiment, the vehicle controller 130 may also bypass the radiator 142 which may be based on additional hardware. It is generally not necessary to cool, or reduce the temperature of the coolant in the motor electronics coolant loop 122. In this case, it may be desirable to provide the coolant from the motor electronics coolant loop 122 to the battery coolant loop 120 to continue to warm the battery 104 accordingly. Similarly, in this case, the battery 104 may be used as a heat sink since the battery 104 is absorbing heat from the coolant provided by the motor electronics coolant loop 122. Thus, in this regard, battery charge may be preserved and NVH may be reduced as a result of not opening the grille shutters 160 and/or the fan 162.

In operation 414, the vehicle controller 130 activates the grille shutters 160, the fan 162, and the radiator 162 to cool the coolant (or reduces the temperature of the coolant) in the motor electronics coolant loop 122. This condition may be generally enough to bring down the temperature of the coolant to an optimum temperature.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for performing motor electronics waste heat recovery, the system comprising:
    at least one battery being positioned about a battery coolant loop that provides first coolant to change a temperature of the at least one battery;
    motor electronics positioned about a motor electronics coolant loop that provides second coolant to change a temperature of the motor electronics; and
    at least one vehicle controller being programmed to:
        receive a first signal indicative of a temperature of the at least one battery positioned about the battery coolant loop; and
        control a valve to combine the battery coolant loop with the motor electronics coolant loop such that the second coolant of the motor electronics coolant loop flows to the battery coolant loop responsive to at least a temperature of the second coolant being greater than the temperature of the at least one battery and a first offset.

2. The system of claim 1, wherein the at least one vehicle controller is further programmed to establish a first temperature threshold responsive to a vehicle being on route to a direct current (DC) based charging station.

3. The system of claim 2, wherein the at least one vehicle controller is further programmed to establish a second temperature threshold responsive to the vehicle being charged via an alternating current (AC) based charger.

4. The system of claim 3, wherein the at least one vehicle controller is further programmed to establish a third temperature threshold responsive to the vehicle exhibiting an ignition being in an ON position.

5. The system of claim 4, wherein the at least one vehicle controller is further programmed to control the valve to combine the battery coolant loop with the motor electronics coolant loop responsive to the temperature of the battery being less than one of the first temperature threshold, the second temperature threshold, or the third temperature threshold.

6. The system of claim 1, wherein the at least one vehicle controller is further programmed to control a pump to run the second coolant through the motor electronics coolant loop for a predetermined amount of time responsive to a vehicle traveling to a direct current (DC) charging station to provide the temperature of the second coolant.

7. The system of claim 1, wherein the at least one vehicle controller is further programmed to control a pump to run the second coolant through the motor electronics coolant loop for a predetermined amount of time responsive to a request to run the second coolant through the motor electronics coolant loop.

8. The system of claim 1, wherein the at least one vehicle controller is further programmed to disable at least one of a fan, grille shutters, and a radiator responsive to a measured temperature of the first coolant in the battery coolant loop being less than a maximum limit of the second coolant in the motor electronics coolant loop.

9. The system of claim 8, wherein the at least one vehicle controller is further programmed to activate at least one of a fan and grille shutters responsive to a measured temperature of the first coolant in the battery coolant loop being greater than the maximum limit of the second coolant in the motor electronics coolant loop.

10. A method for performing motor electronics waste heat recovery, the method comprising:
    providing first coolant to change a temperature of at least one battery positioned about a battery coolant loop;
    providing second coolant to change a temperature of the motor electronics positioned about a motor electronics coolant loop;
    receiving, by at least one vehicle controller, a first signal indicative of a temperature of the at least one battery positioned about the battery coolant loop; and
    controlling a valve to combine the battery coolant loop with the motor electronics coolant loop such that the second coolant of the motor electronics coolant loop flows to the battery coolant loop responsive to at least a temperature of the second coolant being greater than the temperature of the at least one battery and a first offset.

11. The method of claim 10 further comprising establishing a first temperature threshold via the at least one vehicle controller responsive to a vehicle being on route to a direct current (DC) based charging station.

12. The method of claim 11 further comprising establishing a second temperature threshold via the at least one vehicle controller responsive to the vehicle being charged via an alternating current (AC) based charger.

13. The method of claim 12 further comprising establishing a third temperature threshold via the at least one vehicle controller responsive to the vehicle exhibiting an ignition being in an ON position.

14. The method of claim 13 further comprising controlling the valve to combine the battery coolant loop with the motor electronics coolant loop responsive to the temperature of the battery being less than one of the first temperature threshold, the second temperature threshold, or the third temperature threshold.

15. The method of claim 10 further comprising controlling a pump to run the second coolant through the motor electronics coolant loop for a predetermined amount of time responsive to a vehicle traveling to a direct current (DC) charging station to provide the temperature of the second coolant.

16. The method of claim 10 further comprising controlling a pump to run the second coolant through the motor electronics coolant loop for a predetermined amount of time responsive to a request to run the second coolant through the motor electronics coolant loop.

17. The method of claim 10 further comprising disabling at least one of a fan, grille shutters, and a radiator responsive to a measured temperature of the first coolant in the battery coolant loop being less than a maximum limit of the second coolant in the motor electronics coolant loop.

18. The method of claim 17 further comprising activating at least one of a fan and grille shutters responsive to a measured temperature of the first coolant in the battery coolant loop being greater than the maximum limit of the second coolant in the motor electronics coolant loop.

19. A non-transitory computer readable medium storing a computer-program product that is programmed to perform motor electronics waste heat recovery, the computer-program product comprising instructions to:
provide first coolant to change a temperature of at least one battery positioned about a battery coolant loop;
provide second coolant to change a temperature of the motor electronics positioned about a motor electronics coolant loop;
receive, by at least one vehicle controller, a first signal indicative of a temperature of the at least one battery positioned about the battery coolant loop; and
control a valve to combine the battery coolant loop with the motor electronics coolant loop such that the second coolant of the motor electronics coolant loop flows to the battery coolant loop responsive to at least a temperature of the second coolant being greater than the temperature of the at least one battery and a first offset.

\* \* \* \* \*